(12) United States Patent
Stimpson et al.

(10) Patent No.: US 11,603,119 B2
(45) Date of Patent: Mar. 14, 2023

(54) METHOD AND APPARATUS FOR OUT-OF-DISTRIBUTION DETECTION

(71) Applicant: Great Wall Motor Company Limited, Baoding (CN)

(72) Inventors: Alexander Stimpson, West Bloomfield, MI (US); Sham Sundar Narasinga Rao, Bangalore (IN); Kishor Kumar, Bangalore (IN)

(73) Assignee: Great Wall Motor Company Limited, Baoding (CN)

( * ) Notice: Subject to any disclaimer, the term of this patent is extended or adjusted under 35 U.S.C. 154(b) by 403 days.

(21) Appl. No.: 17/067,896

(22) Filed: Oct. 12, 2020

(65) Prior Publication Data

US 2022/0111874 A1 Apr. 14, 2022

(51) Int. Cl.
*B60W 60/00* (2020.01)
*G06N 3/04* (2023.01)
*G06N 3/084* (2023.01)
*G06F 16/56* (2019.01)
*G06F 16/55* (2019.01)
(Continued)

(52) U.S. Cl.
CPC ....... *B60W 60/00276* (2020.02); *G06F 16/55* (2019.01); *G06F 16/56* (2019.01); *G06N 3/0454* (2013.01); *G06N 3/084* (2013.01); *G06V 10/454* (2022.01); *G06V 20/58* (2022.01)

(58) Field of Classification Search
CPC .. B60W 60/00276; G06F 16/55; G06F 16/56; G06N 3/0454; G06N 3/084; G06N 20/00; G06V 10/454; G06V 20/58; G06V 20/56; G06K 9/6223
See application file for complete search history.

(56) References Cited

U.S. PATENT DOCUMENTS

| 9,317,752 B2 * | 4/2016 | Bulan | G06V 20/52 |
| 10,685,255 B2 * | 6/2020 | Fuchs | G06N 3/08 |
| 10,885,099 B1 * | 1/2021 | Price | G06F 16/538 |

(Continued)

OTHER PUBLICATIONS

Denouden, Taylor. An application of out-of-distribution detection for two-stage object detection networks. MS thesis. University of Waterloo, 2020. (Year: 2020).*

(Continued)

*Primary Examiner* — Fayyaz Alam
(74) *Attorney, Agent, or Firm* — Young Basile Hanlon & MacFarlane, P.C.

(57) ABSTRACT

Methods and systems for out-of-distribution (OOD) detection in autonomous driving systems are described. A method for use in an autonomous driving system may include filtering feature vectors. The feature vectors may be filtered using a first filter to obtain clusters of feature vectors. The method may include assigning one or more images to a respective cluster based on a feature vector of the image. The method may include filtering a subset of the images using a second filter to determine a classification model. The method may include storing the classification model on a vehicle control system of a vehicle. The method may include detecting an image using a vehicle sensor. The method may include classifying the detected image based on the classification model. The method may include performing a vehicle action based on the classified detected image.

20 Claims, 9 Drawing Sheets

(51) Int. Cl.
  G06V 10/44 (2022.01)
  G06V 20/58 (2022.01)

(56) References Cited

U.S. PATENT DOCUMENTS 10,929,696 B2 * 2/2021 Zaba ................ G06K 9/627
11,348,661 B2 * 5/2022 Yip ................ C12Q 1/6869

OTHER PUBLICATIONS

Roady, Ryne, et al. "Are out-of-distribution detection methods effective on large-scale datasets?." arXiv preprint arXiv:1910.14034 (2019). (Year: 2019).*
Albuquerque, Isabela, et al. "Improving out-of-distribution generalization via multi-task self-supervised pretraining." arXiv preprint arXiv:2003.13525 (2020). (Year: 2020).*
Marco AF Pimentel, David A Clifton, Lei Clifton, and Lionel Tarassenko. A review of novelty detection. Signal Processing, 99:215-249, 2014.
Pascal Vincent and Yoshua Bengio. Manifold parzen windows. In Advances in neural information processing systems, pp. 849-856, 2003.
Amol Ghoting, Srinivasan Parthasarathy, and Matthew Eric Otey. Fast mining of distance-based outliers in high-dimensional datasets. Data Mining and Knowledge Discovery, 16(3):349-364, 2008.
Luc Devroye, László Györfi, and Gábor Lugosi. A probabilistic theory of pattern recognition, vol. 31. Springer Science & Business Media, 2013.
Lucas Theis, Aäron van den Oord, and Matthias Bethge. A note on the evaluation of generative models. ICLR, 2015.
Mohammad Sabokrou, Mohsen Fayyaz, Mahmood Fathy, et al. Fully convolutional neural network for fast anomaly detection in crowded scenes. arXiv preprint arXiv:1609.00866, 2016.
Jerone T.A Andrews, Thomas Tanay, Edward J. Morton, and Lewis D. Griffin. Transfer representation learning for anomaly detection. In ICML, 2016.
Thomas Schlegl, Philipp Seeböck, Sebastian M Waldstein, Ursula Schmidt-Erfurth, and Georg Langs.Unsupervised anomaly detection with generative adversarial networks to guide marker discovery. In International Conference on Information Processing in Medical Imaging, pp. 146-157. Springer, 2017.
Dan Hendrycks and Kevin Gimpel. A baseline for detecting misclassified and out-of-distribution examples in neural networks. ICLR, 2017.
I. J. Goodfellow, J. Shlens, and C. Szegedy. Explaining and harnessing adversarial examples.2014.
A. Kurakin, I. Goodfellow, and S. Bengio. Adversarial examples in the physical world. In Workshop Track of the International Conference on Learning Representations, 2017.
S. Liang, Y. Li, and R. Srikant. Enhancing the reliability of out-of-distribution image detection in neural networks, 2017.
C. Guo, G. Pleiss, Y. Sun, and K. Q.Weinberger. On calibration of modem neural networks. In 34th International Conference on Machine Learning, 2017.
K. Lee, H. Lee, K. Lee, and J. Shin. Training confidence-calibrated classifiers for detecting out-of distribution samples. 2017.
National Transportation Safety Board. Preliminary Report Highway HWY18MH010, https://www.ntsb.gov/investigations/accidentreports/pages/hwy18mh010-prelim.aspx.
Dario Amodei, Chris Olah, Jacob Steinhardt, Paul Christiano, John Schulman, and Dan Mane. Concrete Problems in AI Safety. arXiv:1606.06565v2 [cs.AI] Jul. 25, 2016.
Philip Koopman, and Michael Wagner. Autonomous Vehicle Safety: An Interdisciplinary Challenge. Jun. 2016.
Quoc V. Le, Marc' Aurelio Ranzato, Rajat Monga, Matthieu Devin, Kai Chen, Greg S. Corrado, Jeff Dean, and Andrew Y. Ng. Building High-level Features Using Large Scale Unsupervised Learning. Proceedings of the 29th International Conference on Machine Learning, 2012.
Prajit Ramachandran, Peter J. Liu, and Quoc V. Le. Unsupervised Pretraining for Sequence to Sequence Learning. arXiv:1611.02683v2 [cs.CL] Feb. 22, 2018.
Alex Kendall, and Yarin Gal. What Uncertainties Do We Need in Bayesian Deep Learning for Computer Vision. arXiv:1703.04977v2 [cs.CV] Oct. 5, 2017.
Antonio Torralba, and Alexei A. Efros. Unbiased Look at Dataset Bias. pp. 1521-1528.
Kaiming He, Xiangyu Zhang, Shaoqing Ren, and Jian Sun. Delving Deep into Rectifiers: Surpassing Human-Level Performance on ImageNet Classification. arXiv:1502.01852v1 [cs.CV] Feb. 6, 2015.
Christian Szegedy, Vincent Vanhoucke, Sergey Ioffe, Jonathon Shlens, and Zbigniew Wojna. Rethinking the Inception Architecture for Computer Vision. arXiv:1512.00567v3 [sc.CV] Dec. 11, 2015.
Francois Chollet. Xception: Deep Learning with Depthwise Separable Convolutions. arXiv:1610.02357v3 [cs.CV] Apr. 4, 2017.
Jia Deng, Wei Dong, Richard Socher, Li-Jia Li, Kai Li, and Li Fei-Fei. ImageNet: A Large-Scale Hierarchical Image Database.
Richard Zhang, Phillip Isola, and Alexei A. Efros. Colorful Image Colorization arXiv:1603.08511v5 [cs.CV] Oct. 5, 2016.
Xiaolong Wang, and Abhinav Gupta. Unsupervised Learning of Visual Representations using Videos. arXiv:1505.00687v2 [cs.CV] Oct. 6, 2015.
Mathilde Caron, Piotr Bojanowski, Armand Joulin, and Matthijs Douze. Deep Clustering for Sunsupervised Learning of Visual Features. arXiv:1807.05520v2 [cs.CV] Mar. 18, 2019.
David E. Rumelhart, Geoffrey E. Hinton, and Ronald J. Williams et al.—Learning representations by back-propagating errors. Letters to Nature, vol. 323, pp. 533-536, Oct. 9, 1986.
Joaquin Quinonero-Candela, Masashi Sugiyama, Anton Schwaighofer, and Neil D. Lawrence. Dataset Shift in Machine Learning. The MIT Press, 2009 http://www.acad.bg/ebook/ml/The.MIT.Press.Dataset.Shift.in.Machine.Learning.Feb.2009.eBook-DDU.pdf.
Jelena Frtunikj, and Simon Furst. Engineering Safe Machine Learning for Automated Driving Systems. Twenty-seventh Safety-Critical Systems Symposium, Bristol, UK, 2019 https://scsc.uk/scsc-150.
NLPR. Chinese Traffic Sign Database. Traffic Sign Recogniation Database. Retrieved Jun. 22, 2020. http://www.nlpr.ia.ac.cn/pal/trafficdata/recognition.html.

* cited by examiner

METHOD AND APPARATUS FOR OUT-OF-DISTRIBUTION DETECTION

TECHNICAL FIELD

This disclosure relates to autonomous vehicles. More specifically, this disclosure relates to detecting out-of-distribution sensor data in safety-critical autonomous driving systems.

BACKGROUND

Safety with respect to out-of-distribution (OOD) data plays an important role with the advent of autonomous driving systems. Many neural networks are based solely on a supervised paradigm and perform well in classification tasks when the training and test data are from the same distribution. These models work well in familiar environments, but when they are deployed in the real world, they fail to generalize when they encounter a distributional shift in the data of unfamiliar environments. Accordingly, they cannot be relied upon as these models have a tendency of over-confidence leading to misclassification, thereby compromising safety-critical functionality when they encounter unseen images.

SUMMARY

Disclosed herein are implementations of out-of-distribution (OOD) detection methods and systems. In an aspect, a method for use in an autonomous driving system may include obtaining a plurality of images. The plurality of images may include OOD data and non-OOD data. The method may include processing the plurality of images using a neural network to obtain a plurality of feature vectors. The method may include filtering the plurality of feature vectors to obtain a plurality of clusters. The method may include assigning an image of the plurality of images to a cluster of the plurality of clusters based on a feature vector of the image. The method may include determining whether the feature vector of the image has a Euclidian distance value that is above a threshold. If the Euclidian distance value of the feature vector of the image is above the threshold, the method may include rejecting the image. If the Euclidian distance value of the feature vector of the image is below the threshold, the method may include filtering the image to determine a classification model. The classification model may be based on the OOD data, the non-OOD data, or both. The method may include storing the classification model on a vehicle control system. The method may include detecting an image using a vehicle sensor. The method may include classifying the detected image based on the classification model. The method may include performing a vehicle action based on the classified detected image.

In an aspect, a method for use in an autonomous driving system may include filtering a plurality of feature vectors. The feature vectors may be filtered using a first filter to obtain a plurality of clusters. The method may include assigning a plurality of images to a respective cluster of the plurality of clusters based on a feature vector of the image. The method may include filtering a subset of the plurality of images using a second filter to determine a classification model. The method may include storing the classification model on a vehicle control system of a vehicle. The method may include detecting an image using a vehicle sensor. The method may include classifying the detected image based on the classification model. The method may include performing a vehicle action based on the classified detected image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
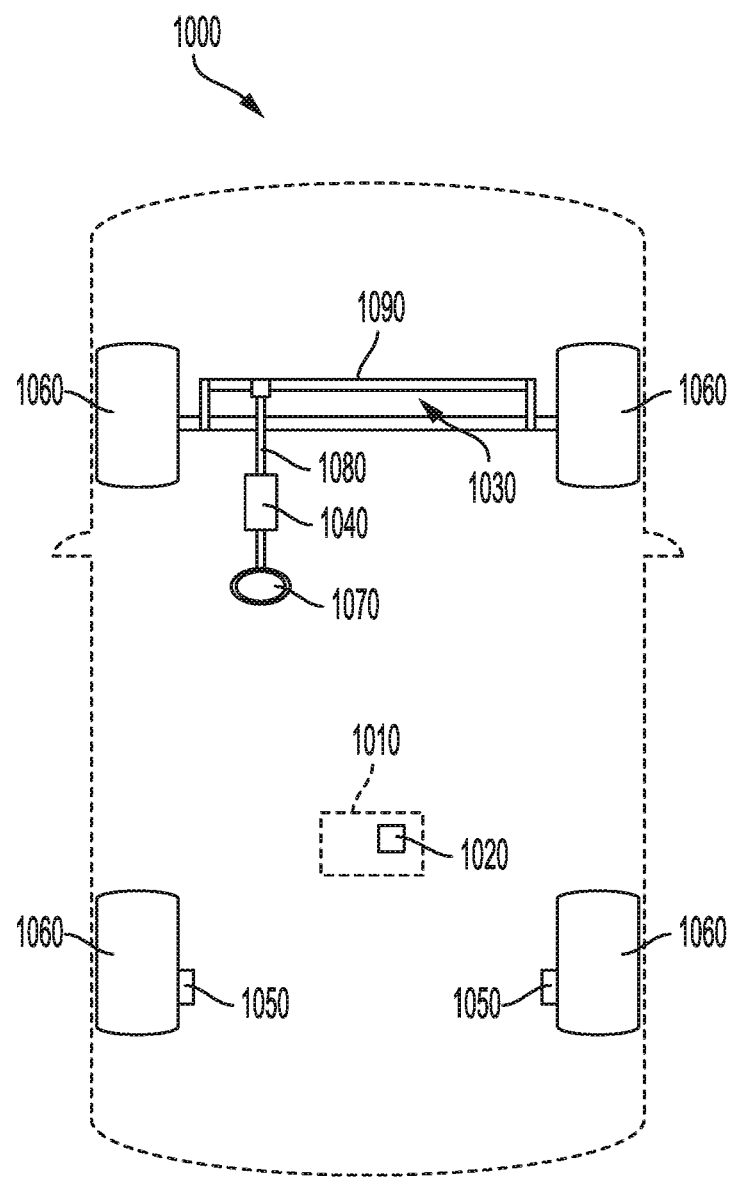
FIG. 1 is a diagram of an example of a vehicle in accordance with embodiments of this disclosure.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

As autonomous vehicles (AV)s come into existence, it is imperative for the AVs to operate in an environment that includes operational scenarios that the model has never encountered or been trained on, i.e. unseen data. An autonomous driving system may be configured to possess robust intelligence if it is configured to perform satisfactorily both in familiar and unfamiliar environments. In most cases, human drivers are not only known to drive comfortably in familiar environments but can also handle complex, fast changing, and partially-observable unfamiliar environments with ease. The reason for being successful is that humans depend upon their knowledge gained through unsupervised and supervised exploration for experiencing the diversity of a real-world setting and reuse the learned concepts and abstractions built from during a life time of driving to quickly adapt based on only a few instances of evidence.

Typical autonomous driving systems have a heavy dependency on cameras, radars, lidars and other sensors to perceive the real-world. The volume of data generation and its diversity is massive. The output data from these devices are fed to machine learning algorithms to interpret their surroundings, e.g. detect and recognize traffic participants such as cars, pedestrians, lane markings, or any combination thereof. Many remarkable deep neural networks (DNN)s based on supervised learning have impressive results for these tasks on the benchmark dataset like ResNet & DenseNet for image recognition, Faster R-CNN for real time object detection, PointNet++ and VoxelNet for object detection using point clouds. But the question arises whether these DNNs can be sufficiently relied for safety-critical decisions, such as in autonomous driving systems.

The typical supervised model used in autonomous driving systems is that the agent is learning based solely on known instances of a dataset (same distributions), which works well in the familiar environment. But in the real-world, the agent fails to generalize unfamiliar environments. Ideally, the agent should have the cognitive capability to evaluate accurately encountered unseen data (i.e., unfamiliar data) rather than acting upon it.

Over time, supervised learning has become the standard artificial intelligence paradigm to make an agent learn from mapping a function from a set of input variables to a target variable. Here the term supervised means during the training process the algorithm is aware of the true labels associated with the input data. Though this approach is fairly successful, it suffers from data-inefficiency and limited generalizations to solve a new unseen (i.e., unfamiliar) task. In some examples, most of the tasks in the supervised setting may be developed by human supervision and hence do well from this distribution.

The embodiments disclosed herein use a hybrid unsupervised/supervised filtering mechanism inspired by a meta-cognition concept to detect out-of-distribution (OOD) image samples effectively. The hybrid model may include a first filter layer, such as an unsupervised classifier, that applies an unsupervised k-means clustering algorithm to partition feature vectors obtained from finite unlabeled images into finite clusters that include a discrete set of natural hidden data structures or patterns filtering out most of the OOD samples. The remaining OOD samples not detected by the first filter layer may be input into a second filter layer, such as a supervised classifier, that applies a supervised learning model using deep neural networks, for example. In some examples, this hybrid model may improve the reduction of accepting OOD samples by 50% or more compared to a standalone supervised model. The hybrid model improves the functioning of a computer with enhanced metacognition features. The hybrid model enhances the technological field of autonomous driving systems by reducing the acceptance of OOD samples to enhance safety.

FIG. 1 is a diagram of an example of a vehicle 1000 in accordance with embodiments of this disclosure. The vehicle 1000 may be an AV or a semi-autonomous vehicle. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brakes 1050 applying a different braking force than the other brakes 1050.

The processor 1020 may be further programmed to command the brake system to apply a braking force, for example a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brakes 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is therefore less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
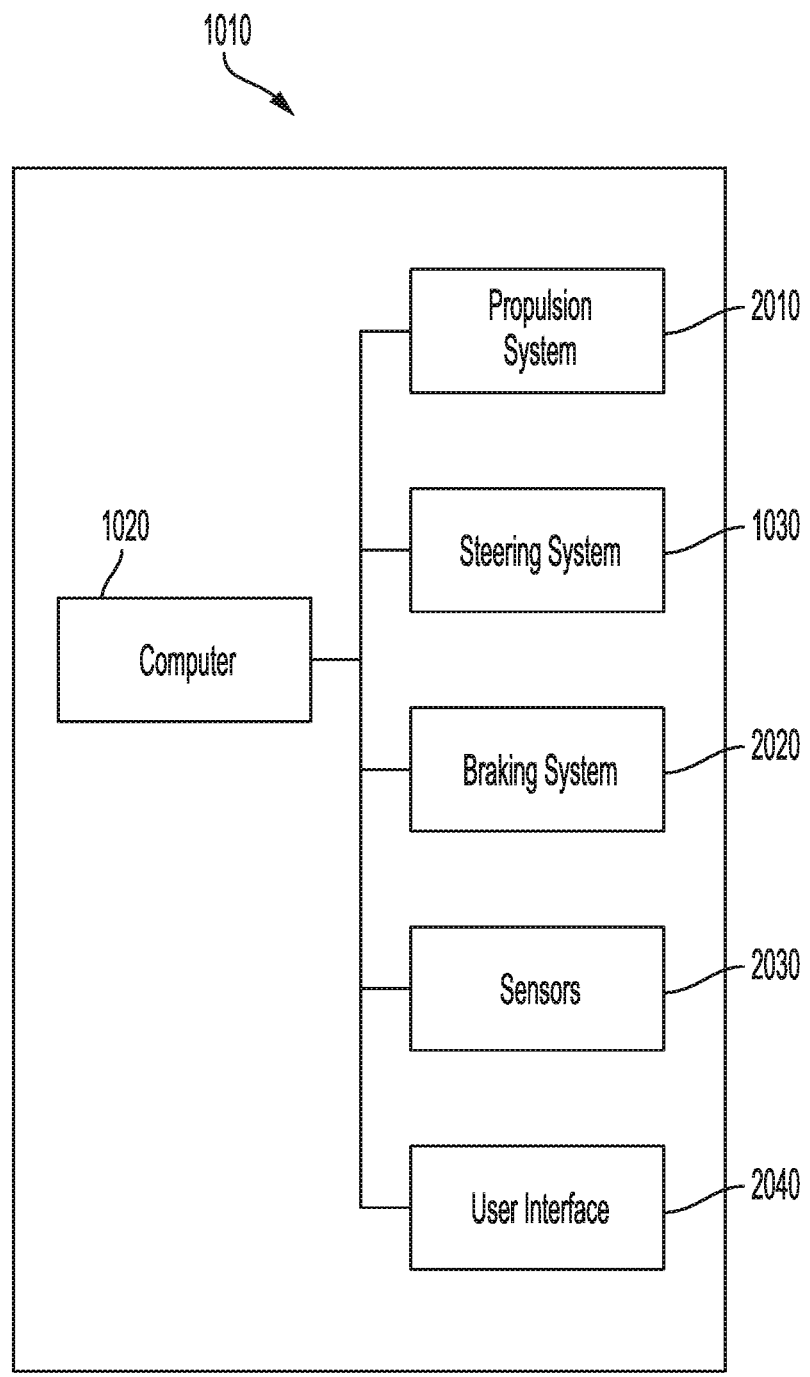
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media, and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by, one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning of the road wheels 1060. The steering column 1080 may be coupled to the steering rack 1090 via a rack-and-pinion, that is, gear meshing between a pinion gear and a rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, GPS sensors; accelerometers such as piezo-electric or microelectromechanical systems (MEMS); gyroscopes such as rate, ring laser, or fiber-optic gyroscopes; inertial measurements units (IMU); and magnetometers. The sensors 2030 may detect the external world, for example, radar sensors, scanning laser range finders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2V) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
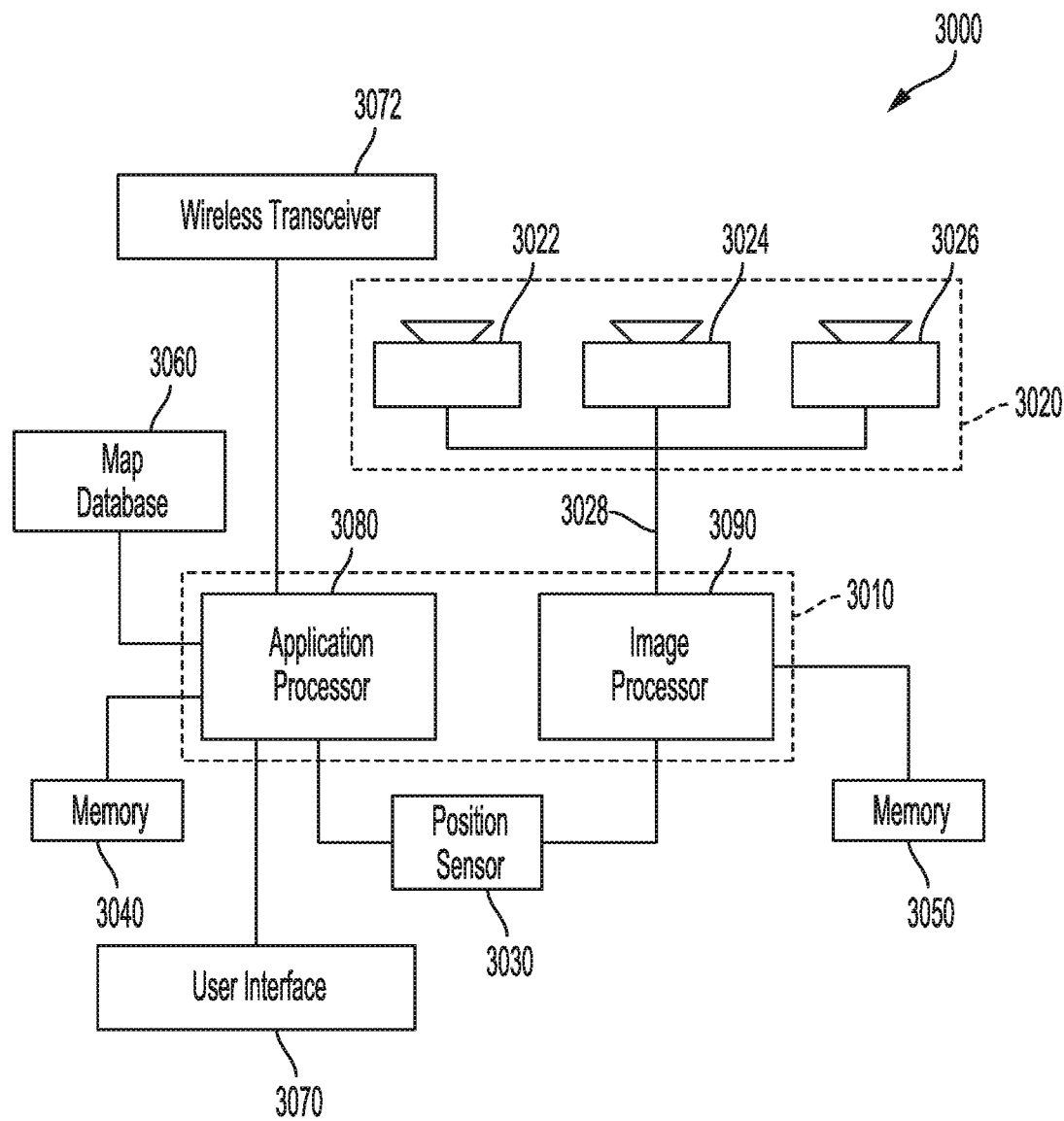
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, image capture device 3024, and image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, ZigBee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

In either case, the processing device configured to perform the sensing, image analysis, and/or navigational functions disclosed herein represents a specialized hardware-based system in control of multiple hardware based components of a host vehicle.

While FIG. 3 depicts two separate processing devices included in processing unit 3010, more or fewer processing devices may be used. For example, in some embodiments, a single processing device may be used to accomplish the tasks of applications processor 3080 and image processor 3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of vehicle control system 3000. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location.

User interface 3070 may include any device suitable for providing information to or for receiving inputs from one or more users of vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items, but also descriptors relating to those items, including, for example, names associated with any of the stored features. In some embodiments, map database 3060 may be physically located with other components of vehicle control system 3000. Alternatively or additionally, map database 3060 or a portion thereof may be located remotely with respect to other components of vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle. In addition to cameras (forward, sideward, rearward, etc.), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
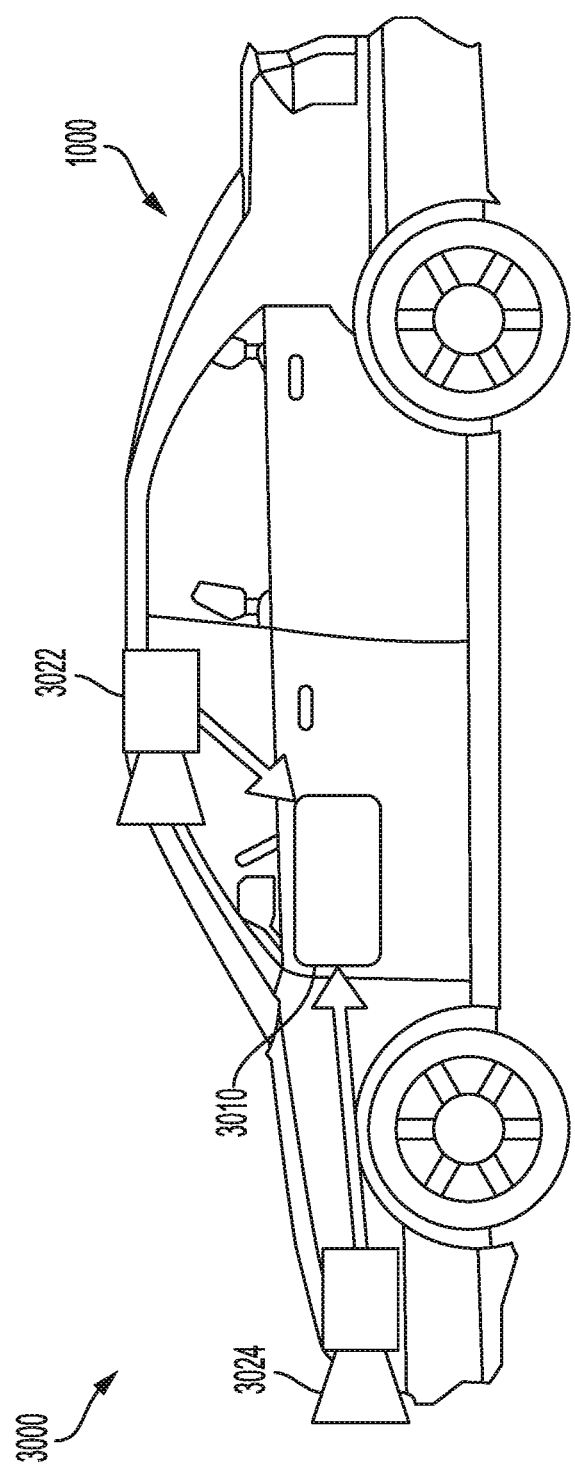
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an Advanced Driver Assistance Systems (ADAS) imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may and/or receive data over one or more networks (e.g., cellular networks, the Internet, etc.). For example, wireless transceiver 3072 may upload data collected by vehicle control system 3000 to one or more servers, and download data from the one or more servers. Via wireless transceiver 3072, vehicle control system 3000 may receive, for example, periodic or on demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by user via, for example, wireless transceiver 3072, be initialized by factory default settings, or by data received by wireless transceiver 3072.

Figure 5:
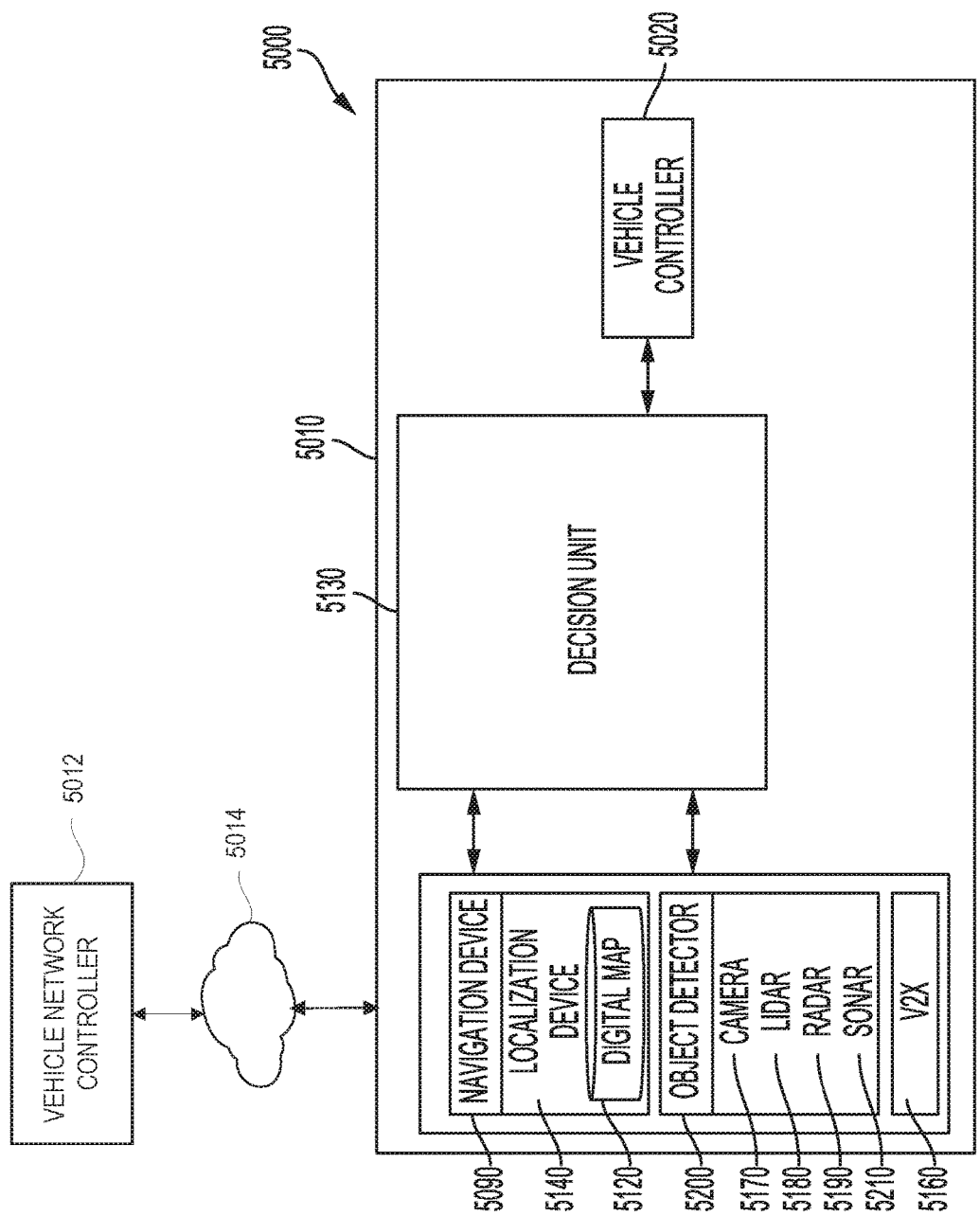
FIG. 5 is a diagram of an example of a vehicle control system in accordance with embodiments of this disclosure.

FIG. 5 is a diagram of an example of a vehicle system architecture 5000 in accordance with embodiments of this disclosure. The vehicle system architecture 5000 may be implemented as part of a host vehicle 5010. As shown in FIG. 5, the vehicle system architecture 5000 may include a vehicle network controller 5012. The vehicle network controller 5012 may be configured to communicate with one or more autonomous vehicles, such as vehicle 5010, via a wireless network 5014. In some embodiments, the vehicle network controller 5012 may be configured to determine classification models and transmit the classification models to each vehicle in the network, for example, vehicle 5010.

Referring to FIG. 5, the vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140, such as a GPS/GNSS receiver and an inertial measurement unit (IMU). A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part by way of V2I communications, V2V communications, vehicle-to-pedestrian (V2P) communications, or a combination thereof, which may generically be labeled as V2X communications 5160.

In some implementations, an object detector 5200 may include the sonar unit 5210, the camera 5170, the LIDAR unit 5180, and the radar unit 5190. The object detector 5200 may be used to detect the relative location of another entity, and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include one or more processors such as a microprocessor or other control circuitry such as analog circuitry, digital circuitry, or both, including an application specific integrated circuit (ASIC) for processing data. The decision unit 5130 may include a memory, including non-volatile memory, such as electrically erasable programmable read-only memory (EEPROM) for storing one or more routines, thresholds, captured data, or a combination thereof. The decision unit 5130 may include at least a mission planner, behavior planner and motion planner, which collectively may be configured to determine or control route or path planning, local driving behavior and trajectory planning for the host vehicle 5010.

The vehicle system architecture 5000 includes a vehicle controller or trajectory tracker 5020 that is in communication with the decision unit 5130. The vehicle controller 5020 may execute a defined geometric path (which may be provided by the motion planner or the decision unit 5130) by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including non-volatile memory, such as electrically erasable programmable read-only memory (EEPROM) for storing one or more routines, thresholds, captured data, or a combination thereof.

The host vehicle 5010 may operate in automated mode where a human operator is not needed to operate the vehicle 5010. In the automated mode, the vehicle control system 5000 (using for example the vehicle controller 5020, the decision unit 5130, navigation device 5090, the object detector 5200 and the other described sensors and devices) autonomously controls the vehicle 5010. Alternatively, the host vehicle may operate in manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

Figure 6:
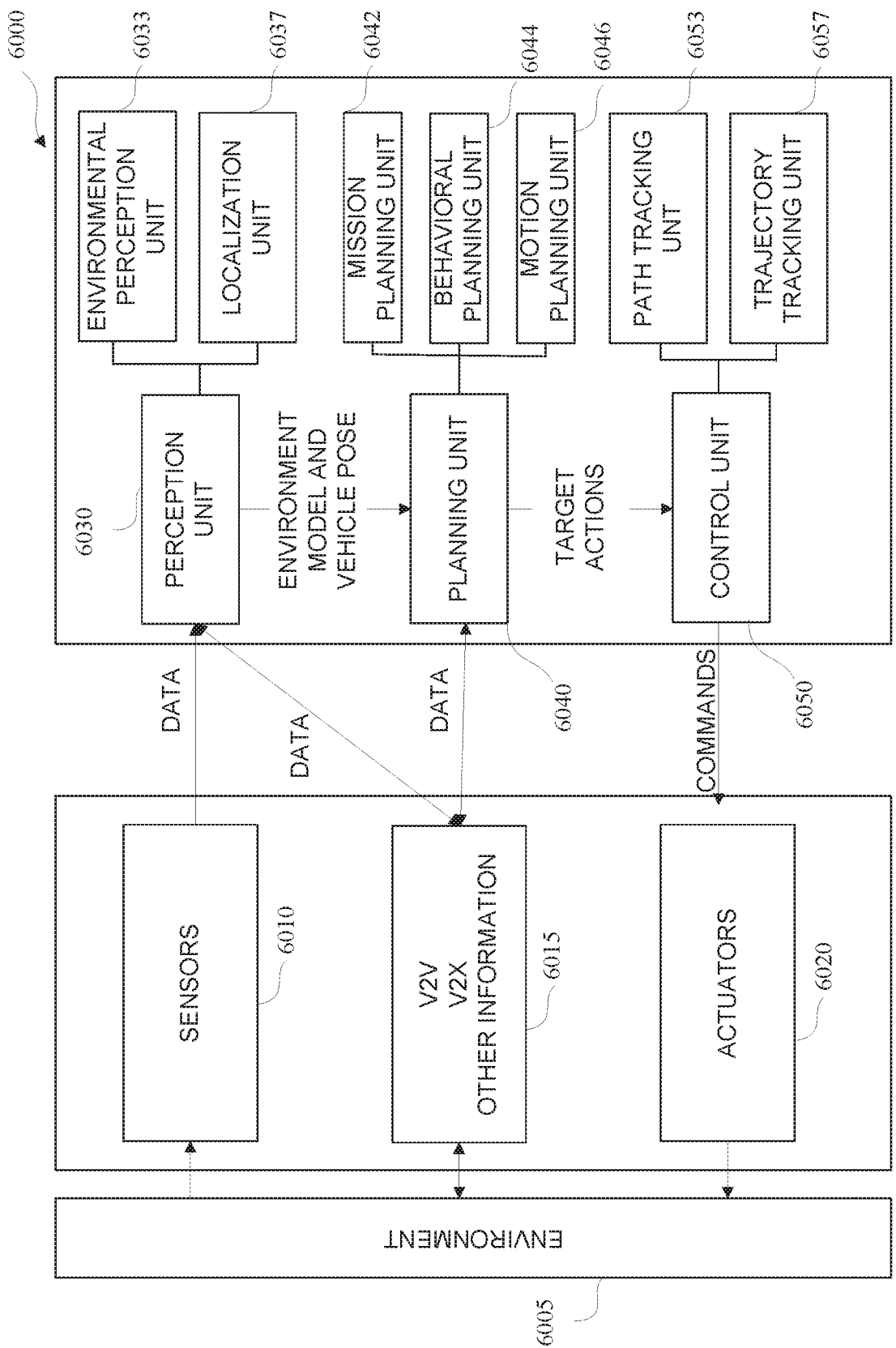
FIG. 6 is a diagram of an example of a vehicle control system in accordance with embodiments of this disclosure.

FIG. 6 is a diagram of an example of a vehicle control system 6000 in accordance with embodiments of this disclosure. The vehicle control system 6000 may include sensors 6010, and V2V, V2X and other like devices 6015 for gathering data regarding an environment 6005, and one or more actuators 6020 associated with steering, braking, and accelerating the vehicle. The data may be used by a perception unit 6030 to extract relevant knowledge from the environment 6005, such as, but not limited to, an environment model and vehicle pose. The perception unit 6030 may include an environmental perception unit 6033 which may use the data to develop a contextual understanding of the environment 6005, such as, but not limited, where obstacles are located, detection of road signs/marking, and categorizing data by their semantic meaning. The perception unit 6030 may further include a localization unit which may be used by the AV to determine its position with respect to the environment 6005. A planning unit 6040 may use the data and output from the perception unit 6030 to make purposeful decisions in order to achieve the AV's higher order goals, which may bring the AV from a start location to a goal location while avoiding obstacles and optimizing over designed heuristics. The planning unit 6040 may include a mission planning unit or planner 6042, a behavioral planning unit or planner 6044, and a motion planning unit or planner 6046. The mission planning unit 6042, for example, may set a strategic goal for the AV, the behavioral planning unit 6044 may determine a driving behavior or vehicle goal state, and the motion planning unit 6046 may compute a trajectory. The perception unit 6030 and the planning unit 6040 may be implemented in the decision unit 5130 of FIG. 5, for example. A control unit or controller 6050 may execute the planned or target actions that have been generated by the higher-level processes, such as the planning unit 6040. The control unit 6050 may include a path tracking unit 6053 and a trajectory tracking unit 6057. The control unit 6050 may be implemented, by the vehicle controller 5020 shown in FIG. 5.

The behavioral planning unit 6044 may include a scene awareness data structure generator in communication with the perception unit 6030, the localization unit 6037, and the mission planning unit 6042. A driving scene and time history may be populated by the scene awareness data structure generator and may be used as inputs to a probabilistic explorer unit. The scene awareness data structure generator may determine a current driving scene state based on the environmental structure provided by the perception unit 6030, the vehicle position provided by the localization unit 6037, and a strategic-level goal provided by the mission planning unit 6042. The current driving scene state may be saved in the driving scene and time history, which may be implemented as a data structure in memory, for example.

Trajectory prediction may be performed using various methods. For example, trajectory prediction may be performed using a probabilistic combination of the outputs from intent estimation and motion prediction. In another example, trajectory prediction may be performed via serial processing of one of intent estimation or motion prediction followed by another intent estimation or motion prediction. The probabilistic combination may be performed by multiplying two or more probabilities. The intent estimation and motion prediction combination may use a single-layer stacking approach where the combination is performed through a weighting function.

Figure 7:
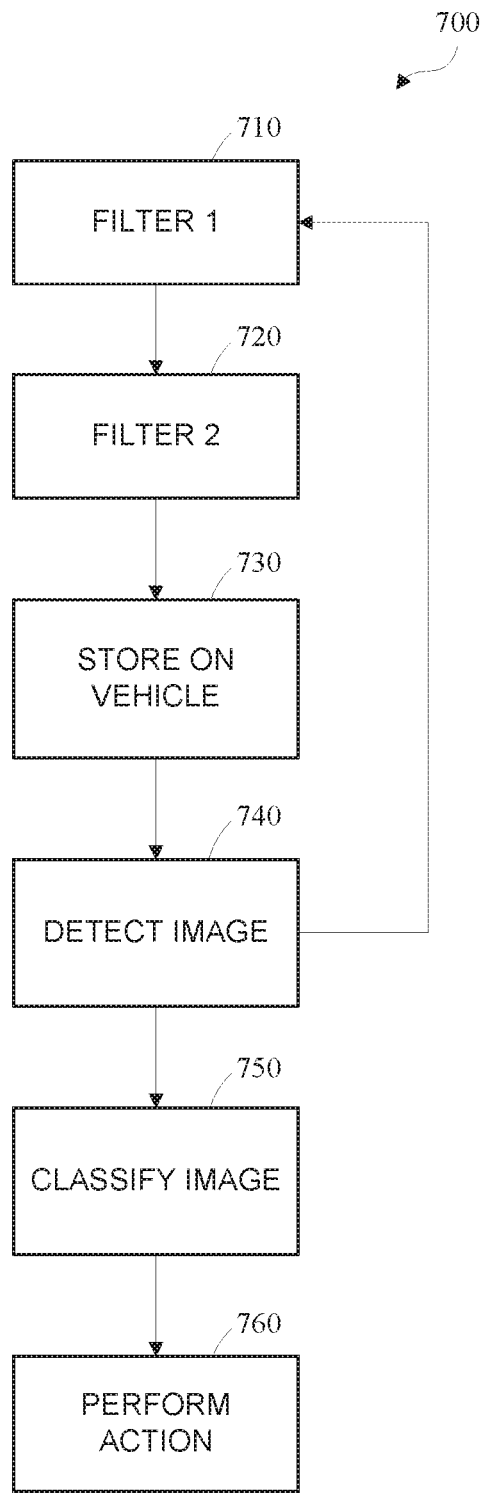
FIG. 7 is a flow diagram of an example of a method for out-of-distribution detection in accordance with embodiments of this disclosure.

FIG. 7 is a flow diagram of an example of a method 700 for out-of-distribution detection in accordance with embodiments of this disclosure. Portions of the method 700 may be performed by a vehicle network controller, such as the vehicle network controller 5012 shown in FIG. 5. The method 700 may be implemented using a hybrid architecture that includes both unsupervised and supervised portions to manage distributional uncertainty.

The method 700 includes filtering 710 feature vectors using a first filter to obtain clusters. In some examples, the filtering 710 may include assigning one or more images to a cluster based on a feature vector of the image. The first filter may be referred to as the first filter layer. The main functionality of the first filter is to reject more unseen input samples and allow the genuine valid samples to enter the model.

The first filter may be an unsupervised learning algorithm, and may filter any number of feature vectors to obtain any number of clusters. The unsupervised learning algorithm is effective due to large scale availability of unlabeled data, and by nature may be less biased since no labels are attached. The unsupervised learning algorithm may be used to process unlabeled data to provide visual information irrespective of a specific domain. In an example, the unsupervised learning algorithm may be a k-means clustering algorithm. In this example, the k-means clustering algorithm may use input from the set of feature vectors resulting from a neural network model, such as a convolutional neural network (CNN) model, and creates K clusters based on geometric criterion.

The k-means clustering algorithm is configured to find cluster centroids that minimize the distance between data points and the nearest centroid. The k-means clustering algorithm may construct a dictionary, $D \in \mathbb{R}^{n \times k}$ of k vector so that a data vector $x^{(i)} \in \mathbb{R}^n$, i=1, ..., m may be mapped to a code vector that minimizes the error in reconstruction. The k-means clustering algorithm may determine D according to:

$$\underset{D,s}{\text{minimize}} \sum_i \|Ds^{(i)} - x^{(i)}\|_2^2 \qquad \text{Equation (1)}$$

Once the clusters are generated, a new data point may be compared to the generated clusters using a Euclidian distance. The Euclidian distance may be compared to a threshold to reduce the acceptance of false positive results. The threshold may be based on the Euclidian distance. Accordingly, the first filter may play an important role in the safety measure of an autonomous driving system.

The method 700 includes filtering 720 a subset of the images using a second filter. The second filter may enhance further validation of the output of the first filter. The second filter acts like a two-factor analysis on both the seen and unseen data. The second filter may be used to make a prediction based on an unforeseen input instance for the classification task from the first filter. The subset of the images may be determined based on a Euclidian distance value of the feature vector of the image. The second filter may utilize a classification model. The second filter may be a supervised learning algorithm. In an example, the supervised learning algorithm may be a multi-layer perceptron may that is used to train a model to generate a prediction.

The method 700 includes storing 730 the classification model on a vehicle control system of a vehicle, for example vehicle control system 5000 of host vehicle 5010 shown in FIG. 5. The method 700 includes detecting 740 an image using one or more vehicle sensors. The vehicle sensors may be any sensor, such as sensors 2030 shown in FIG. 2, and may include for example, radar sensors, scanning laser range finders, light detection and ranging (LIDAR) devices, and image processing sensors such as cameras.

The method 700 includes classifying 750 the detected image. In some examples, the detected image may be used as a future input to the first filter to further refine the classification model. The detected image may be classified based on the classification model. The method 700 includes performing 760 a vehicle action. The vehicle action may be based on the classified detected image. The vehicle action may include controlling, via the vehicle control system, one or more actuators associated with steering, braking, and accelerating the vehicle.

Figure 8:
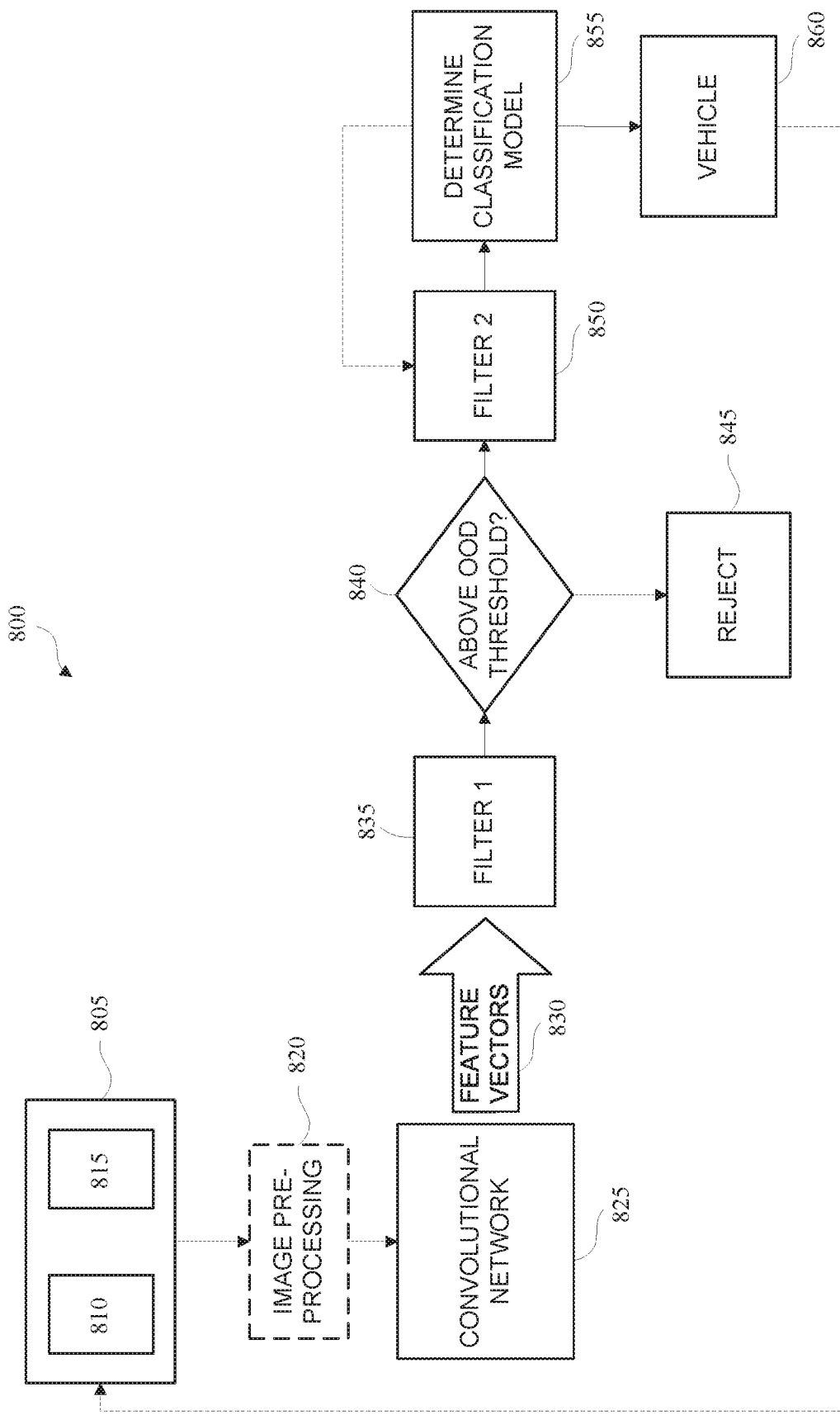
FIG. 8 is a diagram of an example of an architecture 800 for detecting out-of-distribution data in accordance with embodiments of this disclosure.

FIG. 8 is a diagram of an example of an architecture 800 for detecting out-of-distribution data in accordance with embodiments of this disclosure. The architecture 800 may be a hybrid architecture that includes both unsupervised and supervised portions to manage distributional uncertainty. As shown in FIG. 8, data may be an unlabeled dataset that is stored in a database 805. The data stored in database 805 may be image data, and may include out-of-distribution (OOD) data 810 and non-OOD data 815. The OOD data includes data that was not included in the training distribution. In other words, the OOD data may include data from a different distribution than the training distribution. The non-OOD data includes data that was included in the training distribution. The OOD data may include false positives and true negatives. The non-OOD data may include true positives and false negatives.

As shown in FIG. 8, in some examples, image pre-processing 820 may be performed. Image pre-processing 820 may include cropping images, adjusting exposure, performing color correction, adjusting white balance, or any combination thereof. The image pre-processing 820 may not be performed in every instance, and is therefore shown in a dashed line box. The image pre-processing 820 may be performed by an image processor on a vehicle network controller.

The architecture 800 includes a neural network, such as convolutional neural network (CNN) 825. The CNN 825 may be configured with an Xception architecture, and Inception architecture, or a ResNet50 architecture. The CNN 825 includes an output layer. In an example, the output layer of CNN 825 may be any output layer such as an Avg_Pool output layer or a softmax layer, for example. The CNN 825 is configured to map raw images to a feature vector space of fixed dimensionality to obtain feature vectors 830. The best performance may be achieved on determining a classification model when a large amount of data is used for training. In an example, $f_\theta$ and $\theta$ may denote CNN mapping and model parameters, respectively. A vector may be obtained when $f_\theta$ is applied on an image as a feature representation. On a training set $x=\{x1, x2 \ldots x_m\}$ of M images. An optimal $\theta^*$ may be determined such that $f_\theta^*$ produces acceptable general-purpose features. As each image ($x_m$) is associated with label ($y_m$), the optimal $\theta^*$ may be learned with supervision. The label represents the k possible predefined classes.

The architecture 800 includes a first filter 835 configured to obtain the feature vectors 830 from the CNN 825. The first filter 835 is configured to filter the feature vectors 830 to obtain clusters. In some examples, the first filter 835 may assign one or more images to a cluster based on a feature vector of the image. The first filter 835 may be referred to as the first filter layer. The main functionality of the first filter 835 is to reject more unseen input samples and allow the genuine valid samples to enter the model.

The first filter 835 may be an unsupervised learning algorithm, and may filter any number of feature vectors to obtain any number of clusters. The unsupervised learning algorithm is effective due to large scale availability of unlabeled data, and by nature may be less biased since no labels are attached. The unsupervised learning algorithm may provide visual information irrespective of a specific domain. In an example, the unsupervised learning algorithm may be a k-means clustering algorithm. In this example, the k-means clustering algorithm may use input from the set of feature vectors 830 resulting from a neural network model, such as CNN 825, and creates K clusters based on geometric criterion.

The k-means clustering algorithm is configured to find cluster centroids that minimize the distance between data points and the nearest centroid. The k-means clustering algorithm may construct a dictionary, $D \in R^{n \times k}$ of k vector so that a data vector $x^{(i)} \in R^n$, i=1, ..., m may be mapped to a code vector that minimizes the error in reconstruction. The k-means clustering algorithm may determine D according to Equation (1) above.

Using a suitable Euclidian distance as a threshold may reduce the acceptance of false positive results. Accordingly, the first filter may play an important role in the safety measure of an autonomous driving system. As shown in FIG. 8, a determination 840 is made as to whether the feature vector of the image has a Euclidian distance value that is above a threshold. The threshold may be referred to as an OOD threshold. In an example, the threshold for the Euclidian distance value may be about 40. A determination that the Euclidian distance value is above a threshold is an indication that there is no confidence in the image, and that the system should reject 845 the image. In an example, rejecting the image may include determining that the image is a false positive or a false negative.

A determination that the Euclidian distance value is below a threshold indicates that further analysis is required. As shown in FIG. 8, the subset of images that are determined to have a Euclidian distance below the threshold are filtered using a second filter 850. The second filter 850 may enhance further validation of the output of the first filter 835. The second filter 850 acts like a two-factor analysis on both the seen and unseen data. The second filter 850 may be used to make a prediction based on an unforeseen input instance for the classification task from the first filter 835. The subset of the images may be determined based on a Euclidian distance value of the feature vector of the image. The second filter 850 may determine 855 a classification model. Determining the classification model may include determining that the image is a true positive or a true negative. The second filter 850 may be based on a softmax threshold. In an example, the softmax threshold may be approximately 0.95. In some examples, data resulting from an analysis of images using the determined classification model may be used to refine the second filter 850. The classification model may be based on the OOD data and the non-OOD data. The second filter 850 may be a supervised learning algorithm. In an example, the supervised learning algorithm may be a multi-layer perceptron may that is used to train a model to generate a prediction. In an example, the supervised learning algorithm may be a backpropagation (BP) algorithm.

As shown in FIG. 8, the determined classification model may be stored on a vehicle 860. For example, the classification model may be stored on a vehicle control system of the vehicle 860, for example vehicle control system 5000 of host vehicle 5010 shown in FIG. 5. The vehicle 860 may receive the classification model wirelessly via an over-the-air (OTA) update. The vehicle 860 may detect an image using one or more vehicle sensors. The vehicle sensors may be any sensor, such as sensors 2030 shown in FIG. 2, and may include for example, radar sensors, scanning laser range finders, light detection and ranging (LIDAR) devices, and image processing sensors such as cameras.

The vehicle 860 may classify the detected image. In some examples, the detected image may be used as a future input to the first filter 835 to further refine the classification model. The detected image may be classified based on the classification model. The vehicle 860 may perform a vehicle action. The vehicle action may be based on the classified detected image. The vehicle action may include controlling, via the vehicle control system, one or more actuators associated with steering, braking, and accelerating the vehicle 860.

In order to test the hybrid unsupervised/supervised approach, an optimal neural network architecture, output layer, and number of clusters for the k-means clustering algorithm were determined by measuring the impact of the normalized mutual information (NMI) score on different architectures. For the sake of simplicity, a k-means clustering algorithm was used for the unsupervised portion for the first filter. In order to decrease the inter-class similarity (distinctiveness between clusters), a keras implementation was used with the number of total clusters by NMI score. A BP algorithm for the supervised portion was used for the second filter.

The NMI score was used to measure the inter-cluster quality. The information shared between class labels (Y) and cluster labels (C) of the same data was measured as:

$$NMI(Y; C) = \frac{I(Y; C)}{\sqrt{H(Y)H(C)}} \qquad \text{Equation (2)}$$

where I and H represent mutual information and entropy, respectively. The NMI score is in the range of 0 to 1, where 1 indicates the perfect correlation between true class labels and the predicted cluster labels, and 0 indicates no relationship between the labels. A softmax threshold was used for the supervised classifiers.

In this example, the data in the test set included a modified non-curated version of a Chinese Traffic Sign database containing a total number of 2042 images in 12 different classes. Each class had an unbalanced distribution ranging from 70 to 450 unlabeled images.

Figure 9:
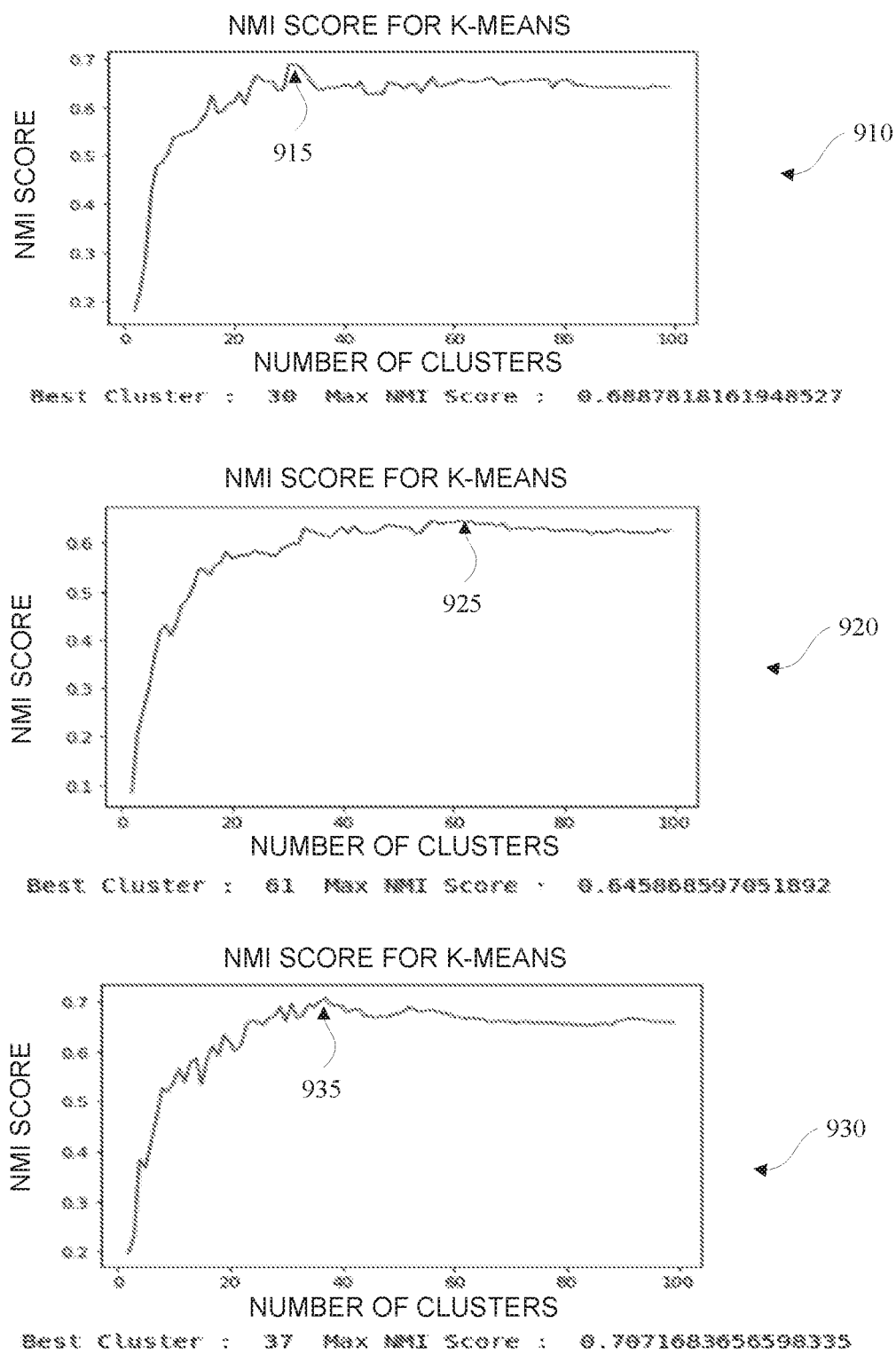
FIG. 9 shows graphs of NMI scoring for determining output layers to obtain feature vectors in accordance with embodiments of this disclosure.

FIG. 9 shows graphs of NMI scoring for determining output layers to obtain feature vectors in accordance with embodiments of this disclosure. As shown in FIG. 9, graphs 910, 920, and 930 each show the NMI scores based on the number of clusters for different neural architectures/output layers.

Graph 910 shows the NMI score based on the number of clusters for an Xception architecture with an Avg_Pool output layer. As shown in graph 910, the maximum NMI score 915 indicates that the optimum number of clusters is 30 when using an Xception architecture with an Avg_Pool output layer. As shown in graph 910, the maximum NMI score is about 0.688 in this example.

Graph 920 shows the NMI score based on the number of clusters for an Inception V3 architecture with an Avg_Pool output layer. As shown in graph 920, the maximum NMI score 925 indicates that the optimum number of clusters is 61 when using an Inception V3 architecture with an Avg_Pool output layer. As shown in graph 920, the maximum NMI score is 0.6458 in this example.

Graph 930 shown the NMI score based on the number of clusters for a ResNet50 architecture with an Avg_Pool output layer. As shown in graph 930, the maximum NMI score 935 indicates that the optimum number of clusters is 37 when using a ResNet50 architecture with an Avg_Pool output layer. As shown in graph 930, the maximum NMI score is 0.707 in this example.

As shown in FIG. 9, the best performance based on a maximum NMI score is obtained using a ResNet50 architecture with an Avg_Pool output layer, where the optimal number of clusters was determined as 37 as shown in graph 930. Since the model was trained on a traffic sign image data set having 12 categories, one would expect K=12 to yield the best results, however in this example, some amount of over-segmentation was found to be beneficial.

Results from an unsupervised model, a supervised model, and a hybrid unsupervised/supervised model may be compared, for example, using 100 samples each for OOD data and non-OOD data. Table 1 below shows results for an unsupervised model for 100 samples each for OOD data and non-OOD data.

TABLE 1

| ED | TP | FN | FP | TN | R | P | A |
|---|---|---|---|---|---|---|---|
| 20 | 92 | 8 | 46 | 54 | 0.92 | 0.66 | 0.73 |
| 25 | 90 | 10 | 35 | 65 | 0.90 | 0.72 | 0.77 |
| 30 | 87 | 13 | 32 | 68 | 0.87 | 0.73 | 0.77 |
| 35 | 84 | 16 | 26 | 74 | 0.84 | 0.76 | 0.79 |
| 40 | 80 | 20 | 20 | 80 | 0.80 | 0.80 | 0.80 |
| 45 | 74 | 26 | 16 | 84 | 0.74 | 0.77 | 0.79 |

For each Euclidian distance (ED), Table 1 above shows a number of true positives (TP)s, a number of false negatives (FN)s, a number of false positives (FP)s, a number of true negatives (TN)s, a recall (R) value, a precision (P) value, and an accuracy (A) value for both non-OOD samples and OOD samples. The TP and FN columns in Table 1 represent the non-OOD samples and the FP and TN columns represent the OOD samples. Based on the recommended values of low recall, high precision, and high overall accuracy, it can be determined from Table 1 that the unsupervised learning is consistently better at identifying both OOD samples and non-OOD samples at an ED value of about 40 (shown in bold). In this example, one may conclude that the unsupervised learning of the first filter is good at reducing the bad samples entering the model in a safety-critical application.

Table 2 below shows results for a supervised model for 100 samples each for OOD data and non-OOD data.

TABLE 2

| ST | TP | FN | FP | TN | R | P | A |
|---|---|---|---|---|---|---|---|
| 0.95 | 81 | 19 | 28 | 72 | 0.81 | 0.75 | 0.76 |
| 0.90 | 84 | 16 | 29 | 71 | 0.84 | 0.74 | 0.77 |
| 0.80 | 88 | 12 | 33 | 67 | 0.88 | 0.72 | 0.77 |
| 0.70 | 91 | 9 | 39 | 61 | 0.91 | 0.70 | 0.76 |
| 0.60 | 95 | 5 | 46 | 54 | 0.95 | 0.67 | 0.74 |
| 0.50 | 96 | 4 | 52 | 48 | 0.96 | 0.64 | 0.72 |

For each softmax threshold (ST), Table 2 above shows a number of true positives (TP)s, a number of false negatives (FN)s, a number of false positives (FP)s, a number of true negatives (TN)s, a recall (R) value, a precision (P) value, and an accuracy (A) value for both non-OOD samples and OOD samples. The TP and FN columns in Table 2 represent the non-OOD samples and the FP and TN columns represent the OOD samples. Based on the recommended values of low recall, high precision, and high overall accuracy, it can be determined from Table 2 that the supervised learning is consistently better at identifying both OOD samples and non-OOD samples at an ST value of about 0.95 (shown in bold).

Table 3 below shows results for a hybrid unsupervised/supervised model for 100 samples each for OOD data and non-OOD data.

TABLE 3

| TP | FN | FP | TN | R | P | A |
|---|---|---|---|---|---|---|
| 73 | 27 | 14 | 86 | 0.73 | 0.83 | 0.79 |

Table 3 above shows a number of true positives (TP)s, a number of false negatives (FN)s, a number of false positives (FP)s, a number of true negatives (TN)s, a recall (R) value, a precision (P) value, and an accuracy (A) value for both non-OOD samples and OOD samples using a hybrid unsupervised/supervised model. The TP and FN columns in Table 3 represent the non-OOD samples and the FP and TN columns represent the OOD samples. Based on the recommended values of low recall, high precision, and high overall accuracy, it can be determined from Table 3 that the hybrid unsupervised/supervised learning is consistently better at identifying both OOD samples and non-OOD samples than either the unsupervised model shown in Table 1 or the supervised model shown in Table 2. For example, the recall value is lower in the hybrid unsupervised/supervised model shown in Table 3 when compared to the unsupervised and supervised models in Tables 1 and 2, respectively. The precision value is higher in the hybrid unsupervised/supervised model shown in Table 3 when compared to the unsupervised and supervised models in Tables 1 and 2, respectively. The accuracy value is higher in the hybrid unsupervised/supervised model shown in Table 3 when compared to the supervised model in Table 2.

Table 4 below is a comparison of evaluation metrics for the unsupervised model, the supervised model, and the hybrid unsupervised/supervised model, where lower numbers indicate better performance.

TABLE 4

| Model | FPR at TPR (max) | Detection Error (De) |
| --- | --- | --- |
| Unsupervised | 0.20 | 0.30 |
| Supervised | 0.28 | 0.37 |
| Hybrid | 0.14 | 0.27 |

Referring to Table 4 above, a false positive rate (FPR) at true positive rate (TPR) at maximum may be interpreted as the probability that the OOD is misclassified as non-OOD when the TPR is high. TPR may be calculated as TPR=TP/(TP+FN). The FPR may be computed as FPR=FP/(FP+TN). The detection error (De) may measure the misclassification probability with the TPR is high. The detection error may be defined as De=0.5(1-TPR)+0.5FPR. As shown in Table 4, the hybrid unsupervised/supervised model outperforms both the unsupervised model and the supervised model alone.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for use in an autonomous driving system, the method comprising:
   obtaining a plurality of images, wherein the plurality of images includes out-of-distribution (OOD) data and non-OOD data;
   processing the plurality of images using a neural network to obtain a plurality of feature vectors;
   filtering the plurality of feature vectors to obtain a plurality of clusters;
   assigning an image of the plurality of images to a cluster of the plurality of clusters based on a feature vector of the image;
   determining whether the feature vector of the image has a Euclidian distance value that is above a threshold;
   on a condition that the Euclidian distance value of the feature vector of the image is above the threshold, rejecting the image;
   on a condition that the Euclidian distance value of the feature vector of the image is below the threshold, filtering the image to determine a classification model, wherein the classification model is based on OOD data and non-OOD data;
   storing the classification model on a vehicle control system;
   detecting an image using a vehicle sensor;
   classifying the detected image based on the classification model; and
   performing a vehicle action based on the classified detected image.

2. The method of claim 1, wherein filtering the image to determine the classification model is based on a softmax threshold.

3. The method of claim 2, wherein the softmax threshold is about 0.95.

4. The method of claim 1, wherein rejecting the image includes determining that the image is a false positive or a false negative.

5. The method of claim 1, wherein determining the classification model includes determining that the image is a true positive or a true negative.

6. The method of claim 1, wherein the vehicle action includes steering a vehicle, decelerating the vehicle, or accelerating the vehicle.

7. The method of claim 1, wherein the threshold for the Euclidian distance value is about 40.

8. The method of claim 1, wherein the OOD data includes false positives and true negatives.

9. The method of claim 1, wherein the non-OOD data includes true positives and false negatives.

10. The method of claim 1, wherein the neural network is a convolutional neural network with and Xception architecture, an Inception V3 architecture, or a ResNet50 architecture.

11. The method of claim 9, wherein the neural network comprises an output layer, wherein the output layer is an Avg_Pool output layer.

12. The method of claim 1, wherein filtering the plurality of feature vectors to obtain the plurality of clusters comprises filtering the plurality of feature vectors using an unsupervised learning algorithm.

13. The method of claim 12, wherein the unsupervised learning algorithm is a k-means clustering algorithm.

14. The method of claim 1, wherein filtering the image to determine the classification model comprises filtering the image using a supervised learning algorithm.

15. The method of claim 14, wherein the supervised learning algorithm is a backpropagation (BP) algorithm.

16. A method for use in an autonomous driving system, the method comprising:
   filtering a plurality of feature vectors using a first filter to obtain a plurality of clusters;
   assigning a plurality of images to a respective cluster of the plurality of clusters based on a feature vector of the image;
   filtering a subset of the plurality of images using a second filter to determine a classification model;
   storing the classification model on a vehicle control system of a vehicle;
   detecting an image using a vehicle sensor;
   classifying the detected image based on the classification model; and
   performing a vehicle action based on the classified detected image.

17. The method of claim 16, wherein the subset of the plurality of images is determined based on a Euclidian distance value of the feature vector of the image.

18. The method of claim 16, wherein the first filter is an unsupervised learning algorithm.

19. The method of claim 16, wherein the second filter is a supervised learning algorithm.

20. The method of claim 16, wherein performing the vehicle action comprises controlling, via the vehicle control system, a plurality of actuators associated with steering, braking, and accelerating the vehicle.

* * * * *